(No Model.) 3 Sheets—Sheet 1.
G. M. NEWHALL.
MACHINE FOR DRYING SUGAR AND OTHER SUBSTANCES.
No. 286,056. Patented Oct. 2, 1883.
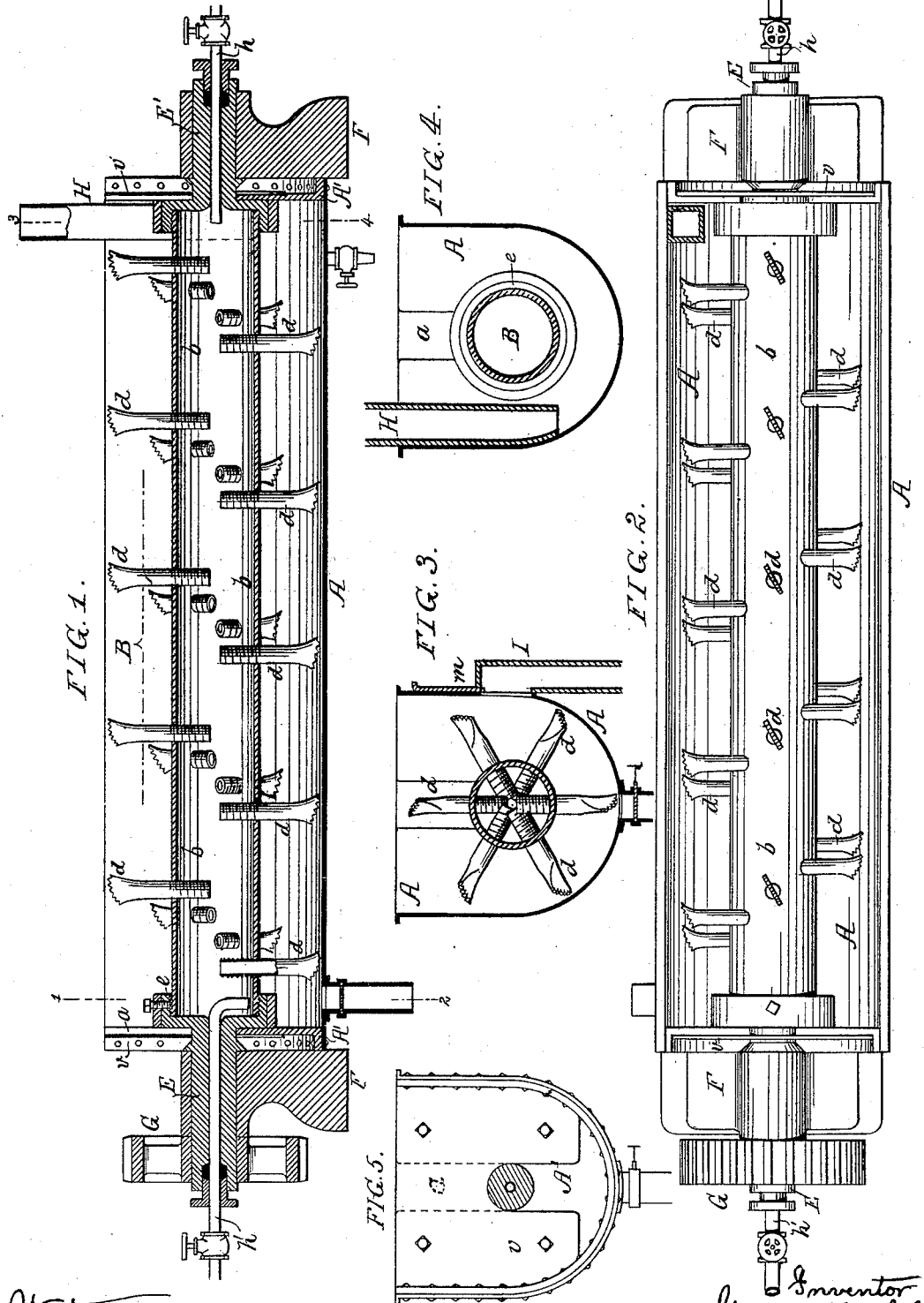
Witnesses
Harry L. Ashenfelter.
James F. Tobin
Inventor
George M. Newhall
by his Attys
Howson & Sons (No Model.) 3 Sheets—Sheet 2.
G. M. NEWHALL.
MACHINE FOR DRYING SUGAR AND OTHER SUBSTANCES.
No. 286,056. Patented Oct. 2, 1883.
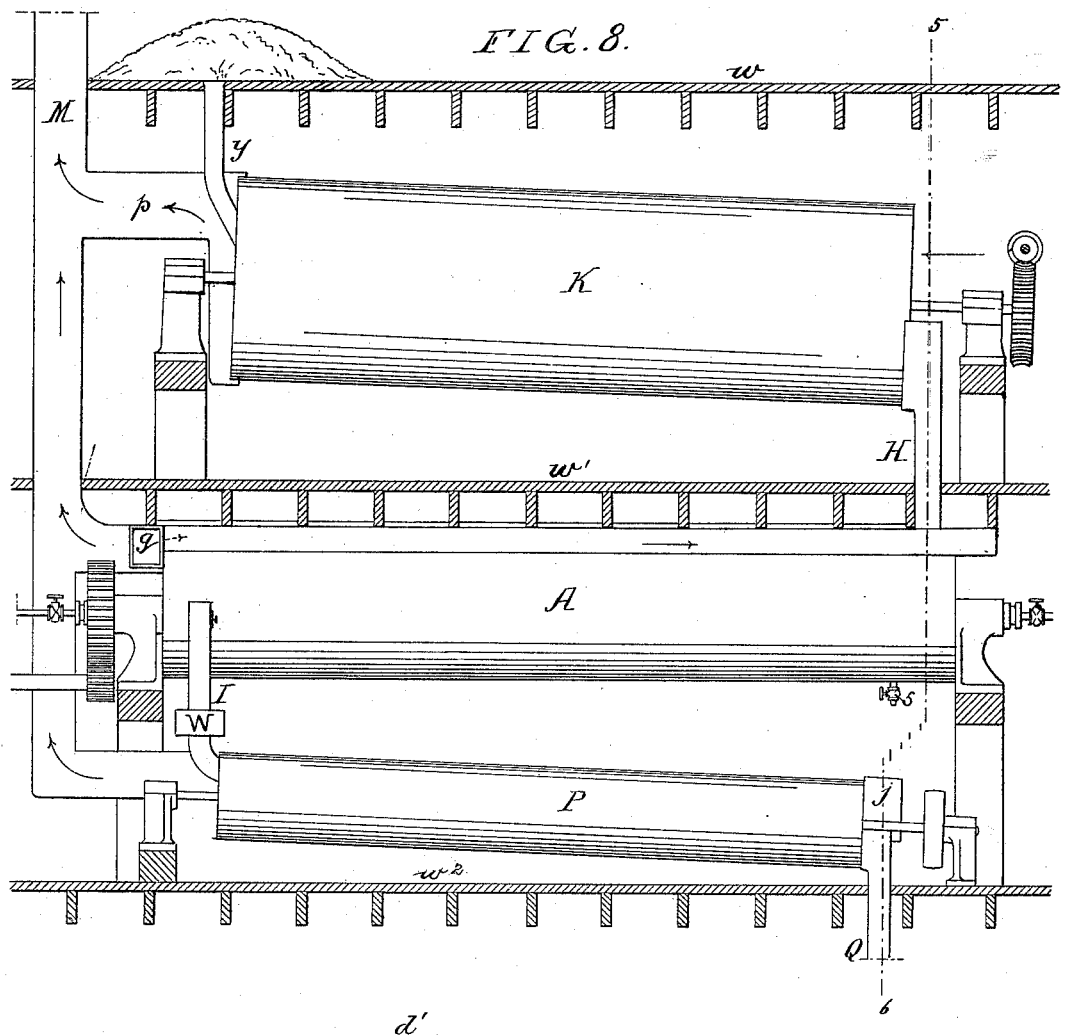

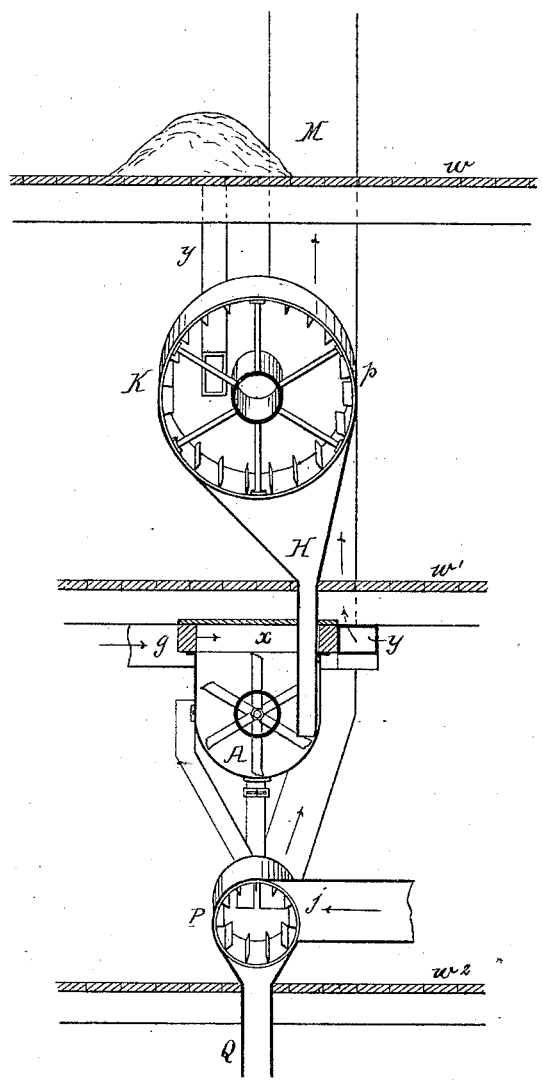

UNITED STATES PATENT OFFICE.

GEORGE M. NEWHALL, OF PHILADELPHIA, PENNSYLVANIA.

MACHINE FOR DRYING SUGAR AND OTHER SUBSTANCES.

SPECIFICATION forming part of Letters Patent No. 286,056, dated October 2, 1883.

Application filed July 9, 1883. (No model.)

*To all whom it may concern:*

Be it known that I, GEORGE M. NEWHALL, a citizen of the United States, and a resident of Philadelphia, Pennsylvania, have invented certain Improvements in Drying Sugar and other Substances, of which the following is a specification.

My invention consists of a certain process and appliances, fully described hereinafter, for thoroughly drying substances such as sugar, and for cooling the same after they have been dried.

In the accompanying drawings, Figure 1, Sheet 1, is a vertical section of a drying-machine constructed in accordance with my invention; Fig. 2, a plan view; Fig. 3, a transverse vertical section on the line 1 2; Fig. 4, a vertical section on the line 3 4; Fig. 5, a view of one of the heads of the drying-cylinder; Figs. 6 and 7, Sheet 2, views of the hollow steam-heated stirring and drying blades; Fig. 8, a view illustrating apparatus for carrying out the process forming part of my invention; and Fig. 9, Sheet 3, a transverse vertical section of Fig. 8 on the line 5 6.

Referring to Figs. 1, 2, 3, and 4, which illustrate the drying-machine forming part of my invention, A is a trough, preferably made of sheet-iron, with cast-iron heads A', to the flanges of which the sheet-iron is riveted or otherwise secured.

B is a combined stirrer and heater, consisting of a tube, $b$, into which are screwed a number of hollow spirally-arranged blades, $d$, referred to hereinafter, the tube being fitted at one end into and secured to a socket, $e$, forming part of a hollow journal, E, and at the opposite end to a socket on the hollow journal E'. The journals are adapted to bearings F F, to which the trough A may be secured, and one of the journals may be furnished with a wheel, G, to be driven by any available gearing.

The heads of the trough are slotted at $a$, as shown in Fig. 5, so as to admit the journals of the stirrer, and when the journals are in place plates $v$ are so fitted to the heads and to the journals as to close the ends of the trough.

A steam-pipe, $h$, furnished with a suitable valve or cock, passes through the journal E' and through a stuffing-box at the end of the same into the tube $b$ of the stirrer, an exhaust-pipe, $h'$, passing through the opposite journal, E, and this pipe being bent downward within the tube $b$, so as to receive the water of condensation.

The substance to be dried is introduced through a pipe, H, into the trough, at one end of the same, and is propelled slowly along the trough by the spirally-arranged blades, escaping finally from the trough through the pipe I or the pipe I', Fig. 3, as the position of adjustable gates $m$ $m$ in said pipes may determine. The substance which escapes from the trough is dry and hot, and in this condition it is directed through the pipe I to a suitable receptacle; but if it is desired to empty the trough A the valve in the pipe I is opened, and the substance is discharged through this pipe. By arranging the outlet I above the bottom of the trough a mass of the substance is always maintained in the trough during the operation of the machine, and the effective action of the stirrers is insured.

The stirrers $d$ are constructed in the manner shown in Figs. 6 and 7, each stirrer consisting of a wrought-iron tube flattened and closed by welding at its outer end, and the closed end $d'$ being serrated, in order to prevent a smooth crust from being deposited upon the inner surface of the trough A, the serrations serving to cut up into fine particles the portions of the mass subjected to their action. The blades extend into the tube $b$ nearly to the center of the same, so that water of condensation in the tube cannot gain access to them. The blades are so arranged that their flattened ends shall be at an angle to the plane of their rotation, whereby they form propellers, and serve to cause the mass to travel from end to end of the tube as it is being agitated.

Complete drying apparatus in accordance with my invention is preferably constructed in the manner illustrated in Figs. 8 and 9, in which $w$, $w'$, and $w^2$ represent the three floors of a building. The substance to be dried is in the first place passed from the upper floor, $w$, through a pipe, $y$, into a drier, K, which may be constructed in accordance with my invention, or may be of any of the usual forms, that shown in the present instance being what is known as the "Hersey drier." Between this drier and the main exhaust-air flue M there is a branch flue, p, for carrying off the vapor evolved from the substance during the process of drying. A single machine of this sort cannot be relied upon to dry substances such as sugar and the like, for a reason which will be explained hereinafter; hence I place one of my improved drying-machines under the floor w', the substance falling from the drier above through the pipe H into one end of the trough A, from the opposite end of which it is discharged through the pipe I. This pipe is preferably furnished with a screen, W, and communicates at the lower end with a cooler, P, which may consist of a simple cylinder rotated by suitable gearing, and provided with internal agitating blades or vanes, the discharge-pipe Q of the cooler leading to any convenient receptacle for the dried material.

It will be seen, on referring to Fig. 9, that the trough A is covered, so as to form a chamber, x, into which air is admitted through a duct, g, at one end of the machine and escapes at the opposite end of the machine through a duct, y, which communicates with the main exhaust-flue M, so that the air for taking up the moisture evolved from the substance which is being dried will traverse the chamber x in a direction contrary to that in which the substance itself is propelled.

The cooler P is simply a revolving drum with internal vanes, as shown in Fig. 9. Air is admitted to the lower end of the cooler through a duct, j, Figs. 8 and 9, the opposite and higher end of the cooler communicating with the main flue M, which is in communication with suitable exhausting mechanism.

In the bottom of the trough A is a pipe, s, provided with a suitable valve, the object of which is to permit the discharge from the trough of water introduced into the same for cleansing purposes.

An important feature of my invention, especially in connection with the drying of sugar, is the partial drying in one machine and the completion of the drying operation in a second machine, the reason of which is as follows: At and near the end of the drying operation a fine dust is formed by the agitation of the dry crystals, and when the entire drying operation is carried on in one machine this dust is conveyed by the blast toward the inlet end of the machine and deposited upon the damp sugar at that point, the dust adhering to the sugar through the subsequent operations, so as to impair the appearance and detract from the quality of the finished product. By my process the preliminary drying in the first machine is not carried to such a point as to produce dust, while the crystals which enter the second machine are not in such a damp condition that dust will adhere to them. In my improved machine, moreover, the tendency of the blast is to carry the dust off at the top of the machine above the surface of the sugar, and thus aid in overcoming the objection referred to.

I claim as my invention—

1. The combination of the trough A with the steam-heated rotating tube b, having hollow spirally-arranged blades d, inclined at the ends, whereby they are adapted to serve as propellers, as set forth.

2. The combination of the trough A with the steam-heated tube b and its hollow blades d, closed and serrated at the outer ends, as set forth.

3. The combination of the trough A with the steam-heated tube b, having hollow blades d, closed at the outer ends and projecting inwardly beyond the inner surface of the tube, whereby the water of condensation is prevented from gaining access to the blades, as set forth.

4. The combination of the stirrer B, having projecting blades d, with the trough A, having an outlet, I, between the top and bottom, as set forth.

5. The combination of the stirrer B, having blades d, with the trough A, having an outlet, I, between the top and bottom, and a valved outlet, I', at the bottom, as set forth.

6. The combination of the steam-heated stirrer B, having journals E E', with bearings for the latter, and with a trough, A, having slotted heads A' and removable plates v, adapted to the said heads and to the journals of the stirrer, as set forth.

7. The mode herein described of effecting the drying of sugar and like substances, said mode consisting in subjecting the said substances to heat and agitation in one machine to effect a partial drying of the same, and then transferring the partially-dried substances to a second machine and subjecting them to further heat and agitation to complete the drying operation, as set forth.

In testimony whereof I have signed my name to this specification in the presence of two subscribing witnesses.

GEORGE M. NEWHALL.

Witnesses:
HARRY L. ASHENFELTER,
HARRY SMITH.